(12) United States Patent
Russell et al.

(10) Patent No.: US 6,711,260 B1
(45) Date of Patent: Mar. 23, 2004

(54) METHOD AND APPARATUS FOR SPECTRAL CONTAINMENT OVER TELEPHONE SERVICE LINES

(75) Inventors: Mark A. Russell, Austin, TX (US); Stephen Weinert, Arlington, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

(21) Appl. No.: 09/376,485

(22) Filed: Aug. 18, 1999

Related U.S. Application Data
(60) Provisional application No. 60/096,958, filed on Aug. 18, 1998.

(51) Int. Cl.[7] .............................. H04M 1/00; H04M 9/00
(52) U.S. Cl. ........................... 379/399.01; 379/390.02; 379/413.04
(58) Field of Search .................. 379/1.03, 1.04, 379/32.04, 201.01, 201.03, 201.05, 201.12, 331, 332, 406.08, 406.12, 390.02, 399.01, 412, 413.02, 413.03, 413.04, 377, 437

(56) References Cited

U.S. PATENT DOCUMENTS

| | | | | |
|---|---|---|---|---|
| 3,937,889 A | * | 2/1976 | Bell, III et al. | 379/399.01 |
| 5,410,343 A | * | 4/1995 | Coddington et al. | 725/99 |
| 5,440,335 A | | 8/1995 | Beveridge | 348/13 |
| 5,469,495 A | | 11/1995 | Beveridge | 379/56 |
| 5,559,624 A | | 9/1996 | Darcie et al. | 359/125 |
| 5,572,397 A | | 11/1996 | Smith et al. | 361/199 |
| 5,592,540 A | | 1/1997 | Beveridge | 379/184 |
| 5,812,786 A | * | 9/1998 | Seazholtz et al. | 709/233 |
| 5,848,150 A | * | 12/1998 | Bingel | 379/399 |
| 5,910,970 A | | 6/1999 | Lu | 375/377 |
| 6,026,160 A | * | 2/2000 | Staber et al. | 379/399 |
| 6,169,788 B1 | * | 1/2001 | McHale et al. | 379/93.14 |
| 6,181,777 B1 | * | 1/2001 | Kiko | 379/34 |
| 6,239,672 B1 | * | 5/2001 | Lutz, Jr. et al. | 333/175 |
| 6,272,219 B1 | * | 8/2001 | De Bruycker et al. | 379/399.01 |
| 6,285,754 B1 | * | 9/2001 | Sun et al. | 379/399 |
| 6,424,646 B1 | * | 7/2002 | Gerszberg et al. | 370/352 |
| 6,452,923 B1 | * | 9/2002 | Gerszberg et al. | 370/352 |
| 6,480,748 B1 | * | 11/2002 | Gerszberg et al. | 700/21 |
| 6,510,152 B1 | * | 1/2003 | Gerszberg et al. | 370/352 |
| 6,542,500 B1 | * | 4/2003 | Gorszberg et al. | 370/354 |

* cited by examiner

Primary Examiner—Binh Tieu
(74) Attorney, Agent, or Firm—Greenblum & Bernstein, P.L.C.

(57) ABSTRACT

A filter passing only desired frequencies is selected according to a desired level of service for copper lines. At a point of access between a loop plant and Central Office, the filter is interposed in series over a telephone service line to provide spectral containment by restricting the frequencies of transmission passing along the line. The filter is preferably mounted within a 6-pin module used in a protector block at the Central Office or remote terminal facility, interfaces with a 5-pin module, or is placed upstream or downstream of a protector block such that it does not interfere with the operation thereof. Service is activated, and the spectral containment apparatus prevents the transmission of unexpected or unintended services over the line.

35 Claims, 5 Drawing Sheets

METHOD AND APPARATUS FOR SPECTRAL CONTAINMENT OVER TELEPHONE SERVICE LINES

CROSS REFERENCES TO RELATED APPLICATIONS

This application claims the benefit of copending U.S. Provisional Patent Application No. 60/096,958, entitled "Method and Apparatus for Spectral Containment over Telephone Service Lines", filed on Aug. 18, 1998, the disclosure of which is expressly incorporated herein by reference in its entirety.

BACKGROUND OF THE INVENTION

1. Field of the Invention

The present invention relates to a method and apparatus for preventing degradation to unexpected or unintended out-of-spectrum services over copper pairs, while permitting intended services to operate.

2. Acronyms

The following acronyms and abbreviations are used throughout the specification. For brevity, the definitions are summarized as follows:

| | |
|---|---|
| xDSL | (generic or any kind of) Digital Subscriber Line |
| ADSL | Asymmetric Digital Subscriber Line |
| BLC | Bridge Lifter Coil |
| CO | Central Office |
| DDS | Digital Data Services |
| ISDN | Integrated Services Digital Network |
| POTS | Plain Old Telephone Service |

3. Description of Background Information

Certain levels of service, demanding a certain bandwidth at a certain portion of the available spectrum, are provided over copper pairs providing the physical connection to a telephone company's Central Office (CO). Typical services available over copper pairs at present include regular analog telephone service (Plain Old Telephone Service—POTS), burglar alarm service, various types of Digital Subscriber Lines (xDSL) including Asymmetric DSL (ADSL), Digital Data Services (DDS), ISDN service, etc. In the context of the present specification, "telephone service lines" includes telephone lines used for burglar alarms.

Different digital services occupy different portions of the spectrum from each other, and digital services tend to occupy a larger portion of the available bandwidth at a higher frequency portion of the spectrum than regular analog telephone services or burglar alarm services (i.e., low bandwidth-low frequency services). When one service or a set of services is assigned to a customer over a loop (a copper pair), no provision is typically made for support, monitoring, or upkeep of any services over that line other than those assigned.

Accordingly, if a loop intended for one service or a limited set of services (e.g., a low-bandwidth low-frequency service alone, or the same in combination with one or more digital services) is unexpectedly used for an additional service, usually having a different spectrum (e.g., one or more additional digital services), the likelihood of unsatisfactory service is high. That is, no support is provided if the line or loop is used for a service other than those assigned to the loop. Moreover, even if the unexpected use of an additional service over a loop intended for a first service is detected, there is no easily implemented or economical manner of taking remedial action to limit or return the loop to the intended service.

SUMMARY OF THE INVENTION

Accordingly, it is one of the objects of the invention to provide an easily implemented, economical method for providing spectral containment over copper pairs at the network side. Moreover, it is a further object of the invention to provide an apparatus for spectral containment useful at the network side.

According to one aspect of the present invention, a method for providing spectral containment over telephone-type service lines, includes selecting a filter having desired spectral characteristics, that passes only frequencies of the desired characteristics. A filter is connected in series to one loop (or more loops), the filter intervening between a loop-plant side and a Central Office side of the loop. Service is then activated over the loop, the filter thereby preventing unexpected transmissions outside of the desired spectral characteristics over the loop.

Optionally, the filter may be connected in series to a loop (or more loops) in a 5-pin module. One pin of the 5-pin module is a ground pin, and the filter intervenes between a loop-plant side and a Central Office side of the module. The 5-pin module may be inserted in a protector block socket in a protector block intervening between the loop-plant side and the Central Office side of the loop.

Alternatively, the filter may be connected in series to a loop (or loops) at a loop plant, the filter intervening between a remote terminal facility and a copper pair side (connecting to, e.g., customer premises) of the loop.

According to another aspect of the present invention, a method for manufacturing a spectral containment unit for preventing unintended or unexpected transmissions, outside of the desired spectral characteristics, over telephone-type service lines, includes selecting a filter having desired spectral characteristics, that passes only frequencies of the desired characteristics. The filter may be connected in series to one loop (or loops) in a 5-pin module, one pin of the 5-pin module being a ground pin, the filter intervening between a loop-plant side and a Central Office side of the module. The 5-pin module is packaged to match a protector block socket in a protector block in a Central Office intervening between a loop-plant side and Central Office side of the loop.

Optionally, a surge protector may be connected in series to the loop (or more loops) in the 5-pin module, the surge protector and the filter each intervening between a loop-plant side and a Central Office side of the module.

Further, the filter may be connected in series between two pins of a loop of a 5-pin plug of the 5-pin module and a remaining two pins of a loop of the 5-pin plug of the 5-pin module. The 5-pin plug is capable of plugging into a 5-pin protector block socket in the protector block. In this manner, the 5-pin module may replace or be formed in combination with a standard module to be plugged into a protector block.

Alternatively, the filter may be connected in series between a 5-pin plug and a 5-pin socket in the 5-pin module, the 5-pin socket being capable of receiving the same 5-pin plug as a 5-pin protector block socket in the protector block. In this manner, the 5-pin module may be placed between a standard module and the protector block.

For either or both of these aspects of the invention, a service to be excluded on the loop (or more loops) may be determined from the group consisting of DDS, ISDN, and xDSL. Then, the filter having spectral characteristics excluding operating frequencies of the determined service is selected. In other words, a service or services assigned to the loop is determined, and a filter that permits substantially only the assigned service(s) is selected.

Alternatively, a frequency range to be excluded on the loop (or loops) is determined from the group consisting of lower than substantially 40 kHz; lower than substantially 80 KHz; and higher than substantially 100 kHz. Then, a filter having spectral characteristics excluding the frequency range and permitting frequencies other than those in the excluded frequency range is selected. In other words, frequencies to be assigned to the loop are determined, and a filter having spectral characteristics permitting substantially only the assigned frequencies is selected.

According to yet another aspect of the present invention, an apparatus for providing spectral containment for preventing unintended transmissions, outside of desired spectral characteristics, over telephone-type service lines, includes a filter having the desired spectral characteristics, that passes only desired frequencies and blocks the unintended transmissions. At least one loop-plant side pair of wires connected to the filter, and at least one Central Office-side pair of wires connected to the filter. A five pin package has two terminals connected to the at least one loop-plant side pair of wires, two terminals connected to the at least one Central Office-side pair of wires, and one terminal connectable to a ground line. The five pin package fits a socket of a protector block intervening between a loop-plant side and a Central Office side of the telephone-type service lines.

According to still another aspect of the present invention, a system for providing spectral containment and preventing unintended transmissions, outside of desired spectral characteristics, over telephone-type service lines, includes a filter having the desired spectral characteristics, that passes only desired frequencies and blocks the unintended transmissions. At least one loop-plant side pair of wires connected to the filter, and at least one Central Office-side pair of wires connected to the filter. A five pin package has two pins connected to the loop-plant side pair of wires, two pins connected to the Central Office-side pair of wires, and one pin connectable to a ground line. A protector block intervenes between the loop-plant side pair of wires and the Central Office side pair of wires at a first point of access of a Central Office. The five pin package fits a socket of the protector block.

Optionally, in these aspects of the invention, the filter may exclude transmissions selected from the group of services consisting of: DDS, ISDN, and XDSL. In addition or alternatively, in these aspects of the invention, the filter may exclude frequency ranges selected from the group consisting of: lower than substantially 40 kHz; lower than substantially 80 KHz; and higher than substantially 100kHz.

The apparatus or system may further include a surge protector connected in series to the loop-plant side pair of wires or the Central Office-side pair of wires. The surge protector and the filter each intervene between the loop-plant side and the Central Office side of the telephone-type service lines.

The apparatus or system may be arranged such that the two terminals connected to the loop-plant side pair of wires include two pins of a 5-pin plug that can plug into a 5-pin protector block socket in the protector block, while the two terminals connected to the Central Office-side pair of wires include another two pins of the 5-pin plug. In this manner, the five pin package may replace or be formed in combination with a standard module to be plugged into a protector block.

The apparatus or system may also be arranged such that the two terminals connected to the at least one loop-plant side pair of wires include two terminals of a 5-pin plug that can plug into a 5-pin protector block socket in the protector block, while the two terminals connected to the Central Office-side pair of wires include two terminals of a 5-pin socket. The 5-pin socket can receive the same 5-pin plug as a 5-pin protector block socket in the protector block. In this manner, the five pin package may be placed between a standard module and the protector block. Further, the 5-pin plug and the 5-pin socket may be formed in the five pin package. As noted above, with this structure, the 5-pin plug fits a socket of the protector block intervening between the loop-plant side and the Central Office side of the telephone-type service lines, while the 5-pin socket receives a protector coil configured to fit a socket of the protector block intervening between the loop-plant side and the Central Office side of the telephone-type service lines.

BRIEF DESCRIPTION OF THE DRAWINGS

The present invention is further explained in the description which follows with reference to the drawings, illustrating, by way of non-limiting examples, various embodiments of the invention, with like reference numerals representing similar parts throughout the several views, and wherein.

DESCRIPTION OF THE PREFERRED EMBODIMENTS

Figure 1:
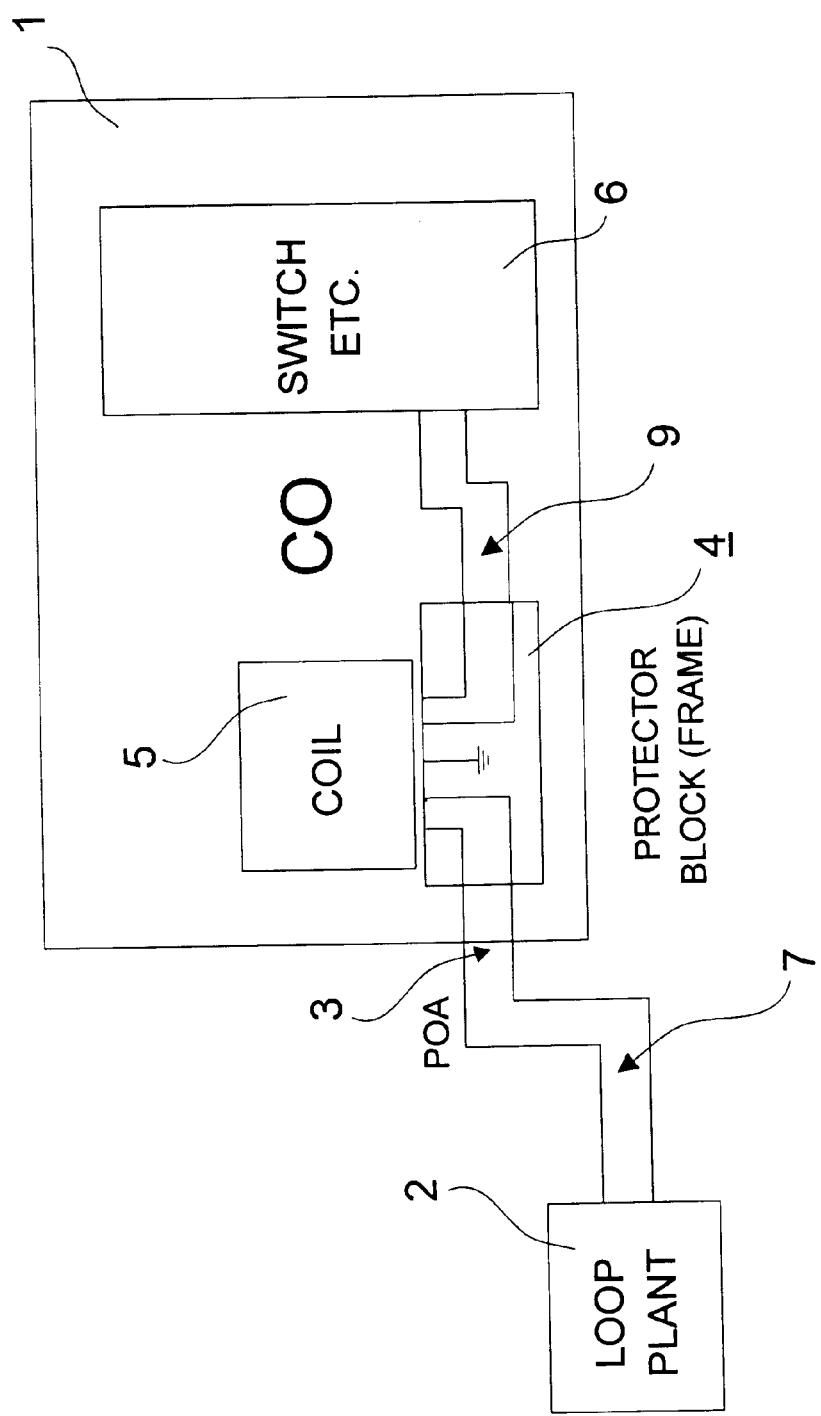
FIG. 1 shows a configuration of a loop plant, Central Office, and protector block.

FIG. 1 shows a typical layout of a Central Office 1, a loop plant 2, and an outgoing copper pair 7. At a first point of access (POA) 3 in a telephone company's Central Office (CO), the outgoing loop(s) or copper pair(s) 7 from the outside loop plant 2 are protected against voltage and/or current surges, e.g., to protect against lightning or other surge-generators over the line. Other modifications to the outgoing pairs may also be taken. For example, pair polarity reversal may be used to compensate for accidental pair (polarity) reversal in the field, or a Bridge Lifter Coil (BLC) may be used as a DC current controlled switch to prevent ringing on undesired phones over a physical party line. The lines may also be identified by service type, typically by color coding a protector coil at the point of access (POA) 3 to denote the service that is operating over that loop.

It should be noted that in the context of the present specification, although signal transmission occurs in both directions, "output" and "outgoing" denote loop-plant side pins, terminals, or wiring, and "input" or "incoming" denote CO-side pins, terminals, or wiring.

Typically, these loop modifications may be implemented at a protector block 4. In this context, and throughout the specification, a "protector block" is a device primarily intended to receive over-voltage (surge) protection elements, usually in the form of plug-in modules, but which may receive a variety of kinds of elements or plug-in modules as described herein. The dimensions and placement of the "protector block" depend on the number and type of lines to be protected, and the "protector block" may be a specific, separate device (e.g., a "protector frame"), or integrated as part of another device. Moreover, a "protector block" may be placed or integrated at more than one point along a loop.

When implemented at the protector block 4, each of the loop modifications typically includes the protector coil that provides surge/voltage protection. A "standard" protector coil includes only the voltage/surge protection, but the other types of loop modification mentioned above also are referred to as "protector coils". Each "outgoing" copper pair or loop 7 is connected to the protector block 4 at the point of access 3. Each "outgoing" copper pair or loop 9 connects the protector block 4 to transmission equipment (a switch, etc.) 6. On the block 4, a protector coil (e.g., coil 5) is connected in series with the line. Protector coils in standard housings, fitting into standard sockets on the protector blocks 4, as noted above, are used for the above noted purposes, the most common of which is to provide the surge (voltage and/or current) protection to the circuitry within the CO 1. The BLC, polarity reversal, and color coding modifications also typically include the surge/voltage protection unit within their respective standard housings.

If a surge (voltage and/or current) protector coil is used in the protector block 4, no effective limitation of bandwidth or frequency occurs. Such lines may be used for virtually any service available on copper pairs, and are subject to the problems outlined in the Background of the Invention. Similarly, polarity pair reversal will not provide any spectral containment.

The present inventor has tested one of the standard protector coils, the Bridge Lifter Coil (BLC) to evaluate the spectral containment capabilities thereof. The BLC is a toroidal coil that is used in multi-party lines to isolate the bridge tap effects of the other lines from the line (loop) in question during outgoing calls. As with the other protector coils, the BLC includes, along with the toroidal coil, a voltage and current protector unit that guards against the kind of surges previously discussed.

The BLC operates in two modes, depending on the DC current on the line (loop). When there is no DC current on the line, the BLC acts as a high impedance, whereas, in the presence of DC current, the BLC acts as a low impedance. When regular analog telephone service is taken off-hook, the DC current generated results in minimal effect on the connection to the Central Office equipment from the BLC . The other lines on the party line, however, see no DC current and therefore appear as a high impedance, as opposed to the lower bridge tap impedance without the BLC.

ADSL was chosen as an exemplary digital service sought to be limited. The present inventor tested the effects of the BLC on high-speed transmission using ADSL. With ADSL only operating over the line, an ADSL modem would not train (operate) even though the loop was very short. When a regular analog telephone line (Plain Old Telephone Service—POTS) was added and was in the off-hook state, however, the modem would train, although at a much lower rate than without the BLC. When the POTS line returned to on-hook, the modem failed. The effect is believed to be due to the DC current included in the POTS connection.

Accordingly, the BLC would not necessarily limit ADSL or other digital services, since the digital services would likely work when used in conjunction with the POTS line. In general, the conclusion is that a Bridge Lifter Coil does not provide satisfactory spectral containment, and only restricts unexpected digital (e.g., ADSL) use if no DC current is present—if a DC current is present, high-bandwidth or digital services would not be limited. However, the BLC does provide current and voltage protection, which would also be desired in the invention.

Figure 2:
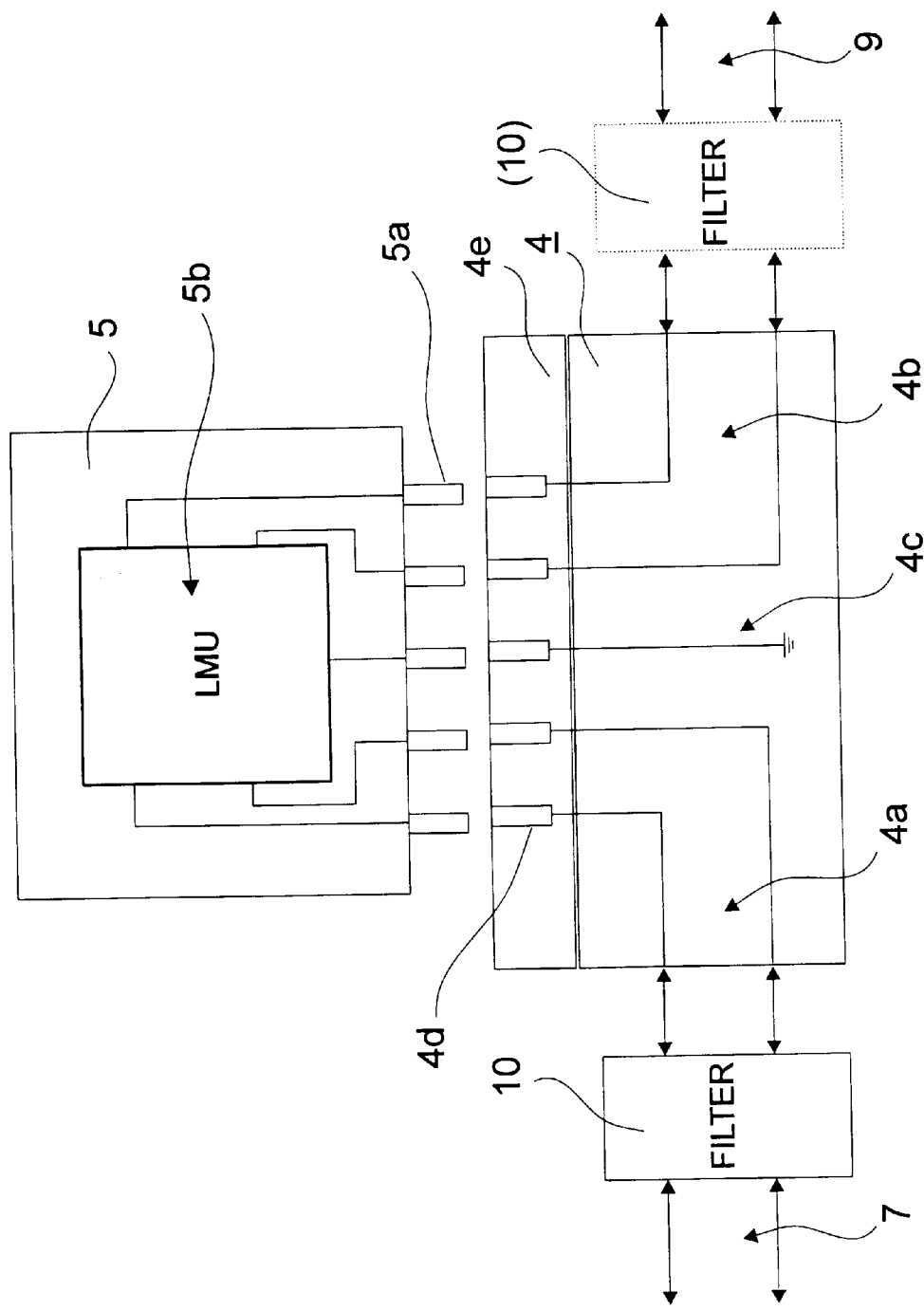
FIG. 2 shows a configuration of a protector block and filter, demonstrating the result of implementing an embodiment of the method of the present invention.

The present invention uses a filter 10 having desired spectral characteristics (low-pass, band-pass, or high-pass) in series with the copper pair/loop 7–9 to provide spectral containment, as shown in FIG. 2. The characteristics of the filter 10 are a function of the spectral use of intended services to ensure that the intended service is not affected, and that any services using excessive spectrum are prevented or contained. For example, if the intended services only use low frequencies, then a low-pass filter passing the appropriate frequencies is selected.

It is known in the art that the following are examples of typical services, each having a band which contains the vast majority of the spectral energy associated with these services:

Analog services: 4 Hz–10 kHz, typically 300 to 3000 Hz for POTS;

DDS up to 64 kB/s: lower than 40 kHz;

ISDN up to 144 kB/s: lower than 80 kHz; and

ADSL: includes higher than 100 kHz

Given these known spectral characteristics, according to the invention, a low-pass filter passing only 10 kHz or below would permit POTS but prevent ISDN, DDS, and ADSL services, a low-pass filter passing only 40 kHz or below would permit POTS and DDS but prevent ISDN and ADSL, and a low-pass filter passing only 100 kHz or below would permit all the listed analog or digital services except ADSL.

According to an embodiment of the method of the present invention, as shown in FIG. 2, an appropriate (low, high, or band-pass) filter 10 having desired spectral characteristics (including desired bandwidth and desired frequencies to pass) of an intended service level is selected, connected in series to an outgoing copper pair 7, intervening between the loop-plant side loop(s) 7 and CO-side loop(s) 9. Service is activated over the line/loop, and is thereafter limited or contained to the selected spectral characteristics of the filter 10, i.e., preventing unintended or unexpected transmissions on/over the loop. The filter 10 may be placed upstream or downstream (the downstream alternative (10) being shown in dotted lines in FIG. 2) of the protector block 4 (usually having a protector coil 5 mounted therein, but which may have a BLC, polarity reversal module, or a color coded protector coil module denoting the service level of the line). In this case, "LMU" 5b in FIG. 2 represents a "loop modification unit", and may denote a voltage/surge protection module (or other module, e.g., BLC, etc.). The module 5 plugs into the protector block via terminals in the form of pins 5a. That is, in the embodiment, a 5-pin "plug" of the module 5 plugs into terminals in the form of a 5-pin socket of the protector block 4. If a color-coded protector coil denoting desired service is used, since the selected filter also corresponds to the desired service, the color coding of the protector coil may reflect the spectral containment of the selected filter.

The low-, high-, or band-pass filter may fit in the same type of casing as the BLC. Since the protector coils, e.g., the BLC and others, use a five-pin standard protector block casing that fits into a standard five-pin socket 4d on the protector block 4, the low-, high, or band-pass filter in the same casing will also fit into the same kind of standard five-pin socket 4d on the protector block 4. The 5-pin plug of the protector coils use 2 input pins, 1 ground pin, and 2 output pins (e.g., terminals or pins 5a of FIG. 2), and the filter module would use the same kind of pin layout. Similarly, the same kind of pin layout and casing would fit into different sizes and shapes of separate and integrated "protector blocks".

The protector coils, including the tested BLC, include a voltage and current protector unit, and if the low, high, or band-pass filter is to use the same kind of housing or casing as the protector coils (one example of a protector coil being the BLC) it is evident that the filter may replace the remaining portions of the coil, e.g., portions other than the voltage/surge protection. As one example, in the case of the BLC, the filter may replace the toroidal coil that provides high/low impedance switching functionality.

Figure 3:
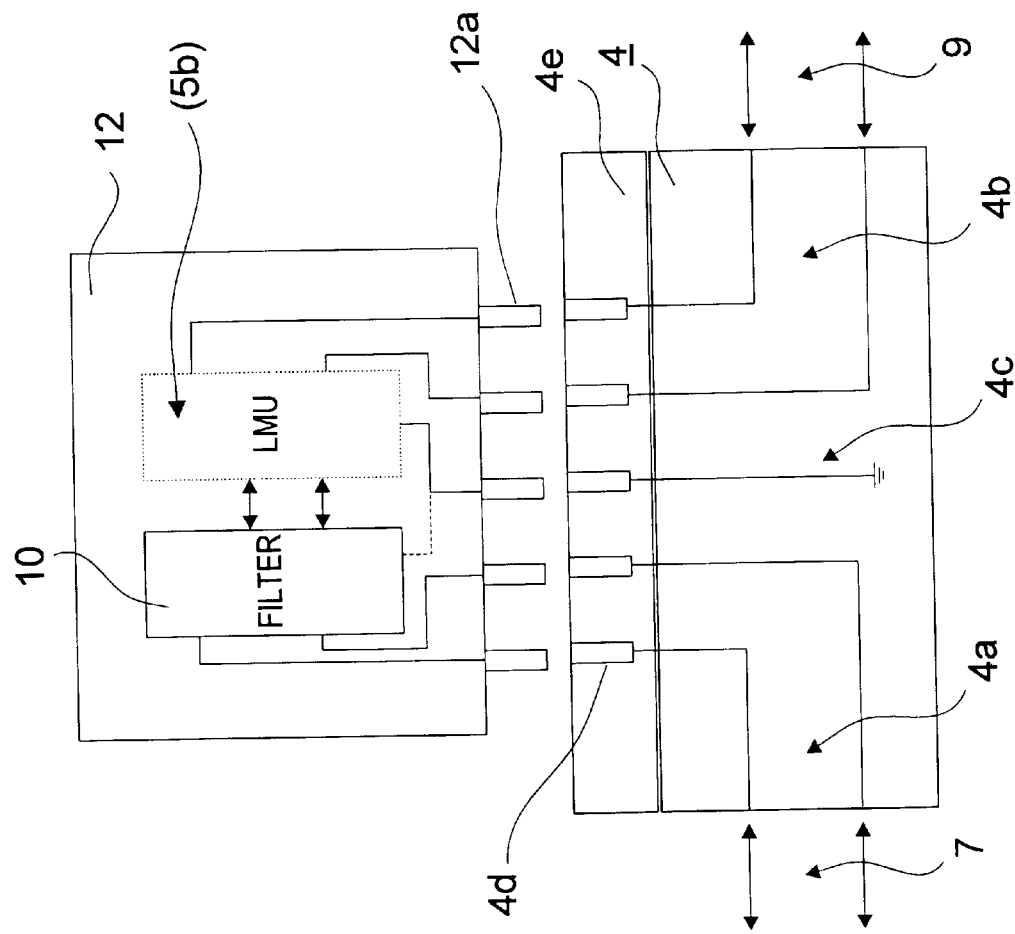
FIG. 3 shows a configuration of a protector block and 5-pin spectrum protector coil module, showing an embodiment of the apparatus of the present invention and demonstrating the result of implementing another embodiment of the method of the present invention.

According to another embodiment of the method of the present invention, as shown in FIG. 3, an appropriate (low, high, or band-pass filter) filter 10 having desired spectral characteristics (including desired bandwidth and desired frequencies to permit) of an intended service level is selected, and connected in series within a standard protector coil package (i.e., the same as the protector coils, e.g., the BLC), forming a "spectrum protector coil" 12, a unit in a standard housing that fits into the protector block 4 while providing the desired spectral containment. Sockets e of the protector block 4 provide a 5-pin socket or 5-pin interface 4d intervening between the loop-plant side wires 4a and the CO-side wires 4b. Terminals in the form of pins 12a are connected to the wires within the housing as described below. The 5-pin plug of the spectrum protector coil 12 is plugged into the 5-pin socket e of the protector block, intervening between the loop-plant side wires 4a/7 and CO-side wires 4b/9. Service is activated over the line/loop, and is thereafter limited or contained to the selected spectral characteristics of the spectrum protector coil 12, i.e., preventing unintended or unexpected transmissions over the line.

According to an embodiment of the apparatus of the present invention as shown in FIG. 3, a filter 10 (low-, high-, or band-pass) having the desired spectral characteristics is placed within the standard housing (i.e., as previously discussed, the same housing as the protector coils or Bridge Lifter Coil). In this case, "LMU" (5b) in FIG. 3 represents a "loop modification unit", and may denote voltage/surge protection (e.g., as in the protector coils or BLC). Two loop-plant side pins (terminals) of the 5-pin plug 12a of the spectrum protector coil module 12 are connected in series to the filter 10. Two CO-side pins (terminals) of the 5-pin plug 12a of the module are also connected in series to the filter 10 (optionally via another loop modification unit, "LMU" (5b), as shown in FIG. 3). The ground pin (terminal) of the 5-pin plug 12a, if necessary for satisfactory operation, may be connected to the filter 10 and/or to the remaining loop modification unit ("LMU" 5b). The resulting spectrum protector coil module 12 may be plugged into socket terminals 4d of a standard 5-pin socket 4e of the protector block, having two loop-plant side wires 4a, a grounded wire 4c, and two CO-side wires 4b. Applying the method described above, service is activated over the line/loop, and is thereafter limited or contained to the selected spectral characteristics of the spectrum protector coil 12, i.e., preventing unintended or unexpected transmissions over the line.

Each protector block 4 typically includes only one 5-pin plug per loop (although the invention is not limited to use with a one-plug-per-loop protector block 4). Accordingly, in this embodiment, when the spectrum protector coil 12 is used with a protector block 4 including only one 5-pin plug per loop, the spectrum protector coil 12 advantageously includes not only spectral containment functionality, but also the functionality of another type of LMU, usually over-voltage (surge) protection.

Figure 4:
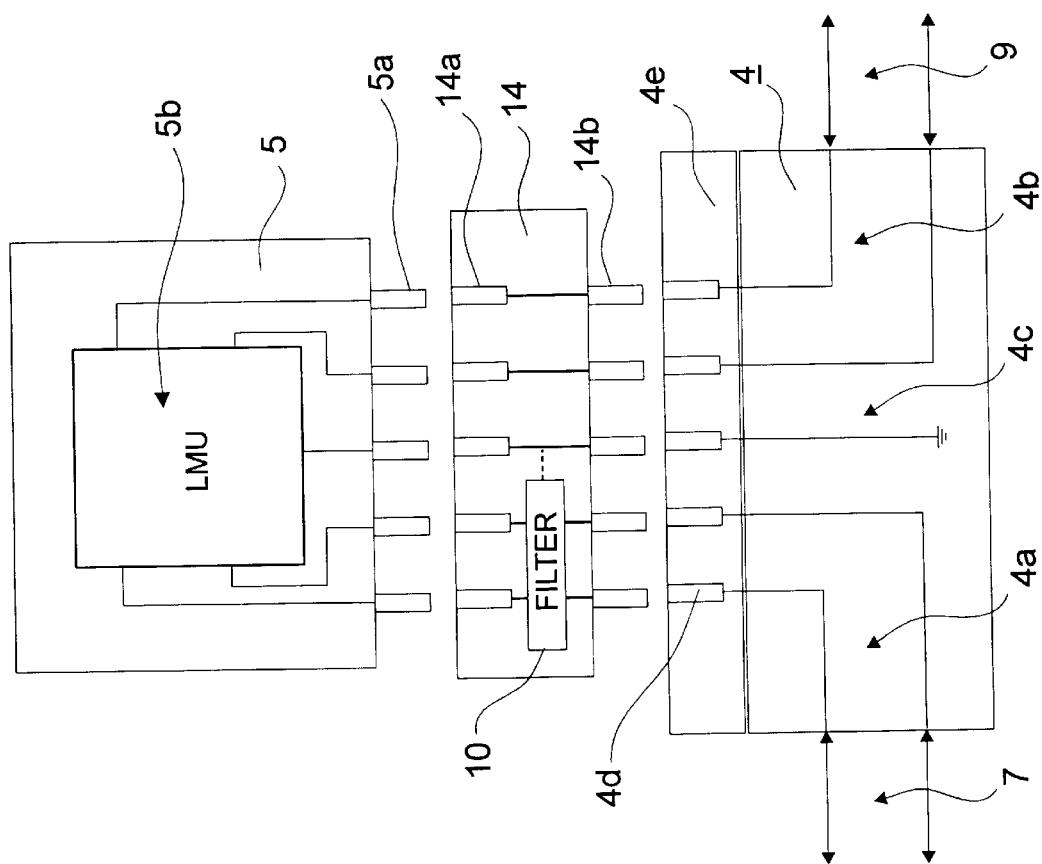
FIG. 4 shows another embodiment of the apparatus of the present invention.

According to another embodiment of the apparatus of the present invention, as shown in FIG. 4, a filter 10 (low-, high-, or band-pass) having the desired spectral characteristics is placed within a spectrum protector coil (convertor) 14 that interfaces with the standard housing (i.e., as previously discussed, the same housing as the Bridge Lifter Coil and other protector coils). In this case, "LMU" (Sb) in FIG. 4 represents the "loop modification unit", and again denotes, e.g., voltage/surge protection (e.g., in a protector coil, BLC, etc.) or other protector coil functionality. Two loop-plant side pins (terminals) of the 5-pin plug 14b of the convertor are connected in series to the protector block socket 4e, and the filter 10 intervenes between the loop-plant side pins and corresponding sockets terminals of the 5-pin socket 14a in the convertor 14. Three remaining pins and socket terminals 14a, 14b (two CO-side pins and socket terminals and a ground pin and socket terminal) match as simple pass-through circuits. Of course, this arrangement may be reversed, and the filter 10 may be interposed in the CO-side rather than the loop-plant side. If necessary for satisfactory operation, the ground pin (terminal) of the 5-pin plug 14b may be connected to the filter 10 and/or to the remaining loop modification unit ("LMU" 5b). The resulting spectrum protector coil (convertor) 14 may be plugged into a standard 5-pin socket 4e of the protector block 4, having two loop-plant side wires 4a, a grounded wire 4c, and two CO-side wires 4b. Any standard module (e.g., voltage/surge protector, BLC, polarity reversal, color-coded) may then be plugged into the spectrum protector coil (convertor) 14. Applying the method described above, service is activated over the line/loop, and is thereafter limited or contained to the selected spectral characteristics of the spectrum protector coil 14, i.e., preventing unintended or unexpected transmissions over the line/loop.

Again, as noted above, each protector block 4 typically includes only one 5-pin plug per loop (although the invention is not limited to use with a one-plug-per-loop protector block 4). Accordingly, when the spectrum protector coil (convertor) 14 is used with a protector block 4 including only one 5-pin plug per loop, the spectrum protector coil (convertor) 14 advantageously permits the functionality of another type of LMU to be used at the same time.

It should be noted that the ground pin (terminal) of the 5-pin plug 12a is typically used for over-voltage (surge) protection. If the module 12 or protector coil (convertor) 14 does not include over-voltage protection, and of no remaining loop modification unit requires a ground connection, the module 12 or protector coil (convertor) 14 may include only four pins, although still plugging into a standard 5-pin socket 4e.

Figure 5:
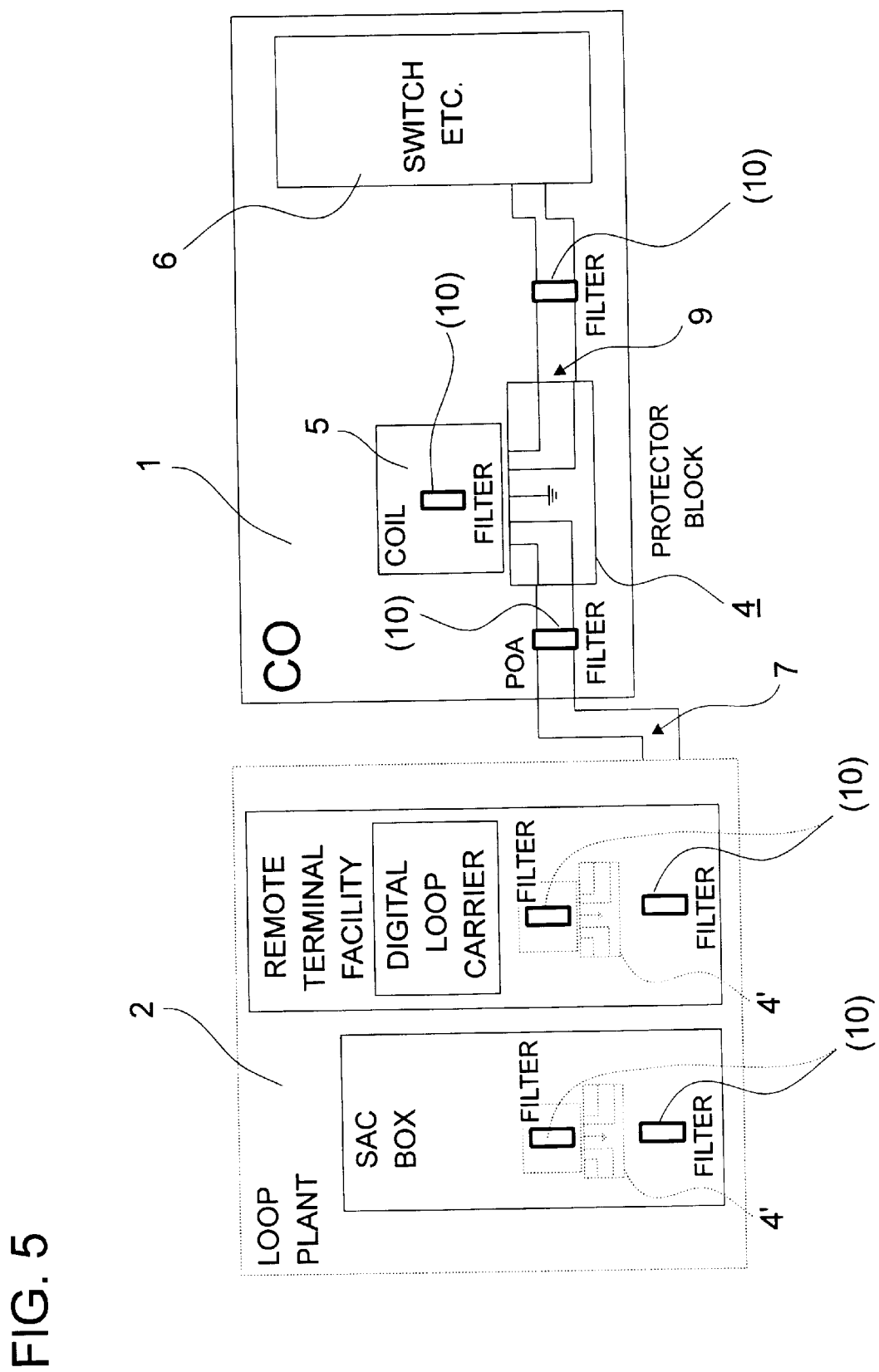
FIG. 5 shows alternative locations of the filter according to the embodiments of the method of the present invention.

Although the preferred mode is to place the filter 10 in the vicinity of the protector block 4 at the Central Office, FIG. 5 shows alternative locations for the filter 10. That is, each location denoted with identifier "(10)" in FIG. 5 is a location where the filter 10, in the form of any of the embodiments, with or without the accompanying protector block 4, could be placed. It is important to note that each location is an alternative, and that only one filter 10 is required to provide the necessary spectral containment for each loop/copper pair.

As shown in FIG. 5, the filter 10 may be placed in the remote terminal facility of the loop plant 2 (with or without a "protector block" 4'); the "SAC box" of the loop plant 2 (with or without a "protector block" 4'); at the Central Office 1 point-of-access (POA) on the loop plant 2 side; in the protector block 4; or in the Central Office 1 on the switch 6 side—so long as the filter 10 is on the loop. The filter 10 may be placed at any location along the loop where there is an interface to a copper loop.

As denoted by dotted lines, a "protector block" 4' may be placed or integrated at the depicted positions to receive a plug-in spectrum protector coil 12 or spectrum protector coil (convertor) 14. In many cases, the "protector block" 4' may already be provided for over-voltage (surge) protection in the loop plant, remote terminal facility, or "SAC" box. Again, as depicted in FIG. 5, each location of a filter "(10)" is an alternative, and only one filter 10 is required to provide the necessary spectral containment for each loop/copper pair. It should be noted that as depicted in FIG. 5, the "protector block" 4' depicted in dotted lines and/or positioned at the loop plant, remote terminal facility, or "SAC" box may receive and/or incorporate any of the embodiments of the method or apparatus of the invention (e.g., filter 10 alone, 5-pin unit 12 with or without additional LMU, or 5-pin unit (convertor) 14 with a standard LMU plug-in).

It should be further noted that although customer premesis are not depicted in FIG. 5, a customer premesis may be connected to the network at the loop plant and/or remote terminal facility at an interface to copper pairs, or in some cases, directly at a Central Office point of access. The spectrum protector coil 12, spectrum protector coil (convertor) 14, or filter 10 may be placed at any location where there is an interface to a copper loop, and in particular, may be placed at a connection point between service provider electronics and the copper pairs (interface) of the loop plant 2 (which are generally connected, in turn, to customer premesis). For example, the filter 10 (or the spectrum protector coil 12/spectrum protector coil (convertor) 14 in conjunction with a protector block) may be placed at the remote terminal facility of the loop plant 2 at the interface to copper connecting to customer premises. Accordingly, the filter may be connected in series to a loop (or loops) at a loop plant, the filter intervening between a remote terminal facility and a copper pair side (connecting to, e.g., customer premesis) of the loop.

Accordingly, with the method and/or apparatus of the present invention, an easily implemented, economical method provides spectral containment over a loop or copper pair, preventing unintended or unexpected levels of service over the protected line/loop. The spectrum protector coil module, in the standard casing (that used for protector coils, including the BLC), permits plug-in spectral containment, e.g., at the Central Office side or at the remote terminal at the interface to copper.

Although the above description sets forth particular embodiments of the present invention, modifications of the invention will be readily apparent to those skilled in the art, and it is intended that the scope of the invention be determined solely by the appended claims.

What is claimed is:

1. A method for providing spectral containment over telephone-type service lines, comprising:
   selecting a filter having desired spectral characteristics, that passes only frequencies of the desired characteristics;
   connecting the filter in series to at least one loop, said filter intervening between a loop-plant side and a Central Office side of the loop; and
   activating service over said at least one loop, said filter thereby preventing unexpected transmissions outside of the desired spectral characteristics over said at least one loop.

2. The method according to claim 1, said connecting further comprising:
   connecting the filter in series to at least one loop in a 5-pin module, one pin of said 5-pin module being a ground pin, said filter intervening between a loop-plant side and a Central Office side of the module; and
   inserting said 5-pin module in a protector block socket in a protector block intervening between said loop-plant side and said Central Office side of said loop.

3. The method according to claim 1, said connecting further comprising:
   connecting the filter in series to at least one loop at a loop plant, said filter intervening between a remote terminal facility and copper pair side of the loop.

4. The method according to claim 1, said selecting further comprising:
   determining a service to be excluded on said at least one loop from the group consisting of DDS, ISDN, and xDSL; then
   selecting a filter having spectral characteristics excluding operating frequencies of the determined service.

5. The method according to claim 1, said selecting further comprising:
   determining a frequency range to be excluded on said at least one loop from the group consisting of lower than substantially 40 kHz; lower than substantially 80 KHz; and higher than substantially 100 kHz; then
   selecting a filter having spectral characteristics excluding said frequency range but permitting frequencies outside of said frequency range.

6. A method for manufacturing a spectral containment unit for preventing unintended or unexpected transmissions, outside of the desired spectral characteristics, over telephone-type service lines, comprising:
   selecting a filter having desired spectral characteristics, that passes only frequencies of the desired characteristics;
   connecting the filter in series to at least one loop in a 5-pin module, one pin of said 5-pin module being a ground pin, said filter intervening between a loop-plant side and a Central Office side of the module; and
   packaging said 5-pin module to match a protector block socket in a protector block intervening between a loop-plant side and Central Office side of said at least one loop in a Central Office.

7. The method according to claim 6, said selecting further comprising:
   determining a service to be excluded by said filter from the group consisting of DDS, ISDN, and xDSL; then
   selecting a filter having spectral characteristics excluding operating frequencies of the determined service.

8. The method according to claim 6, said selecting further comprising
   determining a frequency range to be excluded by said filter from the group consisting of lower than substantially 40 kHz; lower than substantially 80 KHz; and higher than substantially 100 kHz; then
   selecting a filter having spectral characteristics excluding said frequency range but permitting frequencies outside of said frequency range.

9. The method according to claim 6, said connecting further comprising:

connecting a surge protector in series to said at least one loop in said 5-pin module, said surge protector and said filter each intervening between a loop-plant side and a Central Office side of the module.

10. The method according to claim 6, said connecting further comprising:
connecting the filter in series between two pins of a loop of a 5-pin plug of said 5-pin module and a remaining two pins of a loop of said 5-pin plug of said 5-pin module; and said 5-pin plug being capable of plugging into a 5-pin protector block socket in said protector block.

11. The method according to claim 6, said connecting further comprising:
connecting the filter in series between a 5-pin plug and a 5-pin socket in said 5-pin module, said 5-pin socket being capable of receiving a same 5-pin plug as a 5-pin protector block socket in said protector block.

12. An apparatus for providing spectral containment for preventing unintended transmissions, outside of desired spectral characteristics, over telephone-type service lines, comprising:
a filter having the desired spectral characteristics, that passes only desired frequencies and blocks the unintended transmissions;
at least one loop-plant side pair of wires connected to said filter;
at least one Central Office-side pair of wires connected to said filter;
a five pin package having two terminals connected to said at least one loop-plant side pair of wires, two terminals connected to said at least one Central Office-side pair of wires, and one terminal connectable to a ground line, said five pin package fitting a socket of a protector block intervening between a loop-plant side and a Central Office side of the telephone-type service lines.

13. The apparatus according to claim 12, said filter excluding transmissions selected from the group of services consisting of: DDS, ISDN, and xDSL.

14. The apparatus according to claim 12, said filter excluding frequency ranges selected from the group consisting of: lower than substantially 40 kHz; lower than substantially 80 KHz; and higher than substantially 100 kHz.

15. The apparatus according to claim 12, further comprising:
a surge protector connected in series to one of (i) said at least one loop-plant side pair of wires and (ii) said at least one Central Office-side pair of wires, said surge protector and said filter each intervening between said loop-plant side and said Central Office side of the telephone-type service lines.

16. The apparatus according to claim 12, wherein
said two terminals connected to said at least one loop-plant side pair of wires comprise two pins of a 5-pin plug, said 5-pin plug being capable of plugging into a 5-pin protector block socket in said protector block, and
said two terminals connected to said at least one Central Office-side pair of wires comprise another two pins of said 5-pin plug.

17. The apparatus according to claim 12, wherein
said two terminals connected to said at least one loop-plant side pair of wires comprise two terminals of a 5-pin plug, said 5-pin plug being capable of plugging into a 5-pin protector block socket in said protector block, and
said two terminals connected to said at least one Central Office-side pair of wires comprise two terminals of a 5-pin socket, said 5-pin socket being capable of receiving a same 5-pin plug as a 5-pin protector block socket in said protector block.

18. The apparatus according to claim 17, wherein said 5-pin plug and said 5-pin socket are formed in said five pin package, said 5-pin plug fitting a socket of the protector block intervening between the loop-plant side and the Central Office side of the telephone-type service lines, and said 5-pin socket receiving a protector coil configured to fit a socket of the protector block intervening between the loop-plant side and the Central Office side of the telephone-type service lines.

19. A system for providing spectral containment and preventing unintended transmissions, outside of desired spectral characteristics, over telephone-type service lines, comprising:
a filter having the desired spectral characteristics, that passes only desired frequencies and blocks the unintended transmissions;
at least one loop-plant side pair of wires connected to said filter;
at least one Central Office-side pair of wires connected to said filter;
a five pin package having two pins connected to said at least one loop-plant side pair of wires, two pins connected to said at least one Central Office-side pair of wires, and one pin connectable to a ground line; and
a protector block intervening between said at least one loop-plant side pair of wires and said at least one Central Office side pair of wires at a first point of access of a Central Office, said five pin package fitting a socket of said protector block.

20. The apparatus according to claim 19, said filter excluding transmissions selected from the group of services consisting of: DDS, ISDN, and xDSL.

21. The apparatus according to claim 19, said filter excluding frequency ranges selected from the group consisting of: lower than substantially 40 kHz; lower than substantially 80 KHz; and higher than substantially 100 kHz.

22. The apparatus according to claim 19, further comprising:
a surge protector connected in series to one of (i) said at least one loop-plant side pair of wires and (ii) said at least one Central Office-side pair of wires, said surge protector and said filter each intervening between said loop-plant side and said Central Office side of the telephone-type service lines.

23. The apparatus according to claim 19, wherein
said two terminals connected to said at least one loop-plant side pair of wires comprise two pins of a 5-pin plug, said 5-pin plug being capable of plugging into a 5-pin protector block socket in said protector block, and
said two terminals connected to said at least one Central Office-side pair of wires comprise another two pins of said 5-pin plug.

24. The apparatus according to claim 19, wherein
said two terminals connected to said at least one loop-plant side pair of wires comprise two terminals of a 5-pin plug, said 5-pin plug being capable of plugging into a 5-pin protector block socket in said protector block, and
said two terminals connected to said at least one Central Office-side pair of wires comprise two terminals of a 5-pin socket, said 5-pin socket being capable of receiving a same 5-pin plug as a 5-pin protector block socket in said protector block.

25. The apparatus according to claim 24, wherein said 5-pin plug and said 5-pin socket are formed in said five pin package, said 5-pin plug fitting a socket of the protector block intervening between the loop-plant side and the Central Office side of the telephone-type service lines, and said 5-pin socket receiving a protector coil configured to fit a socket of the protector block intervening between the loop-plant side and the Central Office side of the telephone-type service lines.

26. A method for providing spectral containment over telephone-type service lines, comprising:

selecting a filter having desired spectral characteristics, that passes only frequencies of the desired characteristics;

connecting the filter in series to at least one branchless loop, said filter intervening between a loop-plant side and a Central Office side of the branchless loop; and activating service over said at least one branchless loop, said filter thereby preventing unexpected transmissions outside of the desired spectral characteristics over said at least one branchless loop.

27. The method according to claim 26, said connecting further comprising:

connecting the filter in series to at least one branchless loop in a 5-pin module, one pin of said 5-pin module being a ground pin, said filter intervening between a loop-plant side and a Central Office side of the module; and inserting said 5-pin module in a protector block socket in a protector block intervening between said loop-plant side and said Central Office side of said branchless loop.

28. The method according to claim 26, said connecting further comprising:

connecting the filter in series to at least one branchless loop at a loop plant, said filter intervening between a remote terminal facility and copper pair side of the at least one branchless loop.

29. The method according to claim 26, said selecting further comprising:

determining a service to be excluded on said at least one branchless loop from the group consisting of DDS, ISDN, and xDSL; then selecting a filter having spectral characteristics excluding operating frequencies of the determined service.

30. The method according to claim 26, said selecting further comprising:

determining a frequency range to be excluded on said at least one branchless loop from the group consisting of lower than substantially 40 kHz; lower than substantially 80 KHz; and higher than substantially 100 kHz; then selecting a filter having spectral characteristics excluding said frequency range but permitting frequencies outside of said frequency range.

31. A method for providing spectral containment over telephone-type service lines, comprising:

selecting a filter having desired spectral characteristics, that passes only frequencies of the desired characteristics;

connecting the filter in series to at least one loop, said filter intervening between a loop-plant side and a Central Office side of the loop in a position where the filter's spectral characteristics affect the entirety of said at least one loop; and activating service over said at least one loop, said filter thereby preventing unexpected transmissions outside of the desired spectral characteristics over said at least one loop.

32. The method according to claim 31, said connecting further comprising:

connecting the filter in series to at least one loop in a 5-pin module, one pin of said 5-pin module being a ground pin, said filter intervening between a loop-plant side and a Central Office side of the module; and inserting said 5-pin module in a protector block socket in a protector block intervening between said loop-plant side and said Central Office side of said loop.

33. The method according to claim 31, said connecting further comprising:

connecting the filter in series to at least one loop at a loop plant, said filter intervening between a remote terminal facility and copper pair side of the loop.

34. The method according to claim 31, said selecting further comprising:

determining a service to be excluded on said at least one loop from the group consisting of DDS, ISDN, and xDSL; then selecting a filter having spectral characteristics excluding operating frequencies of the determined service.

35. The method according to claim 31, said selecting further comprising:

determining a frequency range to be excluded on said at least one loop from the group consisting of lower than substantially 40 kHz; lower than substantially 80 KHz; and higher than substantially 100 kHz; then selecting a filter having spectral characteristics excluding said frequency range but permitting frequencies outside of said frequency range.

* * * * *